No. 771,263. Patented October 4, 1904.

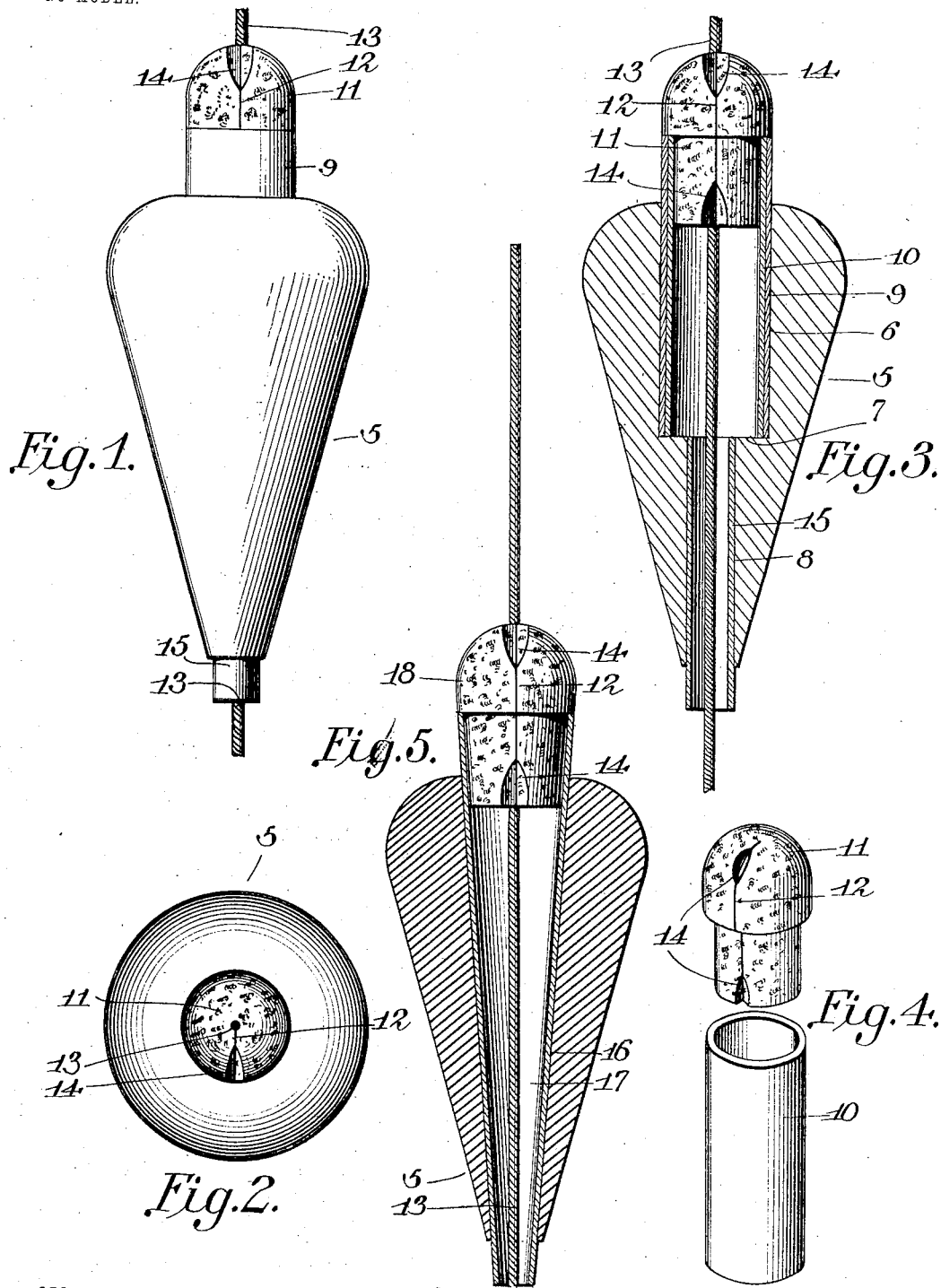

UNITED STATES PATENT OFFICE.

ANDREW J. McCORD, OF CHATTANOOGA, TENNESSEE.

FISHING-CORK.

SPECIFICATION forming part of Letters Patent No. 771,263, dated October 4, 1904.

Application filed February 15, 1904. Serial No. 193,708. (No model.)

*To all whom it may concern:*

Be it known that I, ANDREW J. MCCORD, a citizen of the United States, residing at Chattanooga, in the county of Hamilton and State of Tennessee, have invented a new and useful Fishing-Cork, of which the following is a specification.

This invention relates to an improved float or bob for fish-lines, and has for its object to provide a simple, inexpensive, and efficient device of this character capable of being readily attached to or detached from the line and which may be quickly and conveniently adjusted thereon without the necessity of looping, knotting, or otherwise tying the line.

A further object of the invention is to provide the float or bob with a yieldable clamping member adapted to engage the line and retain the bob in adjusted position thereon.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a side elevation of a float or bob constructed in accordance with my invention. Fig. 2 is a top plan view of the same. Fig. 3 is a longitudinal sectional view. Fig. 4 is a detail perspective view of the clamping member detached. Fig. 5 is a longitudinal sectional view of a modified form of the invention.

Similar numerals of reference indicate corresponding parts in all the figures of the drawings.

The float or bob 5, which may be of any desired shape or configuration and formed of wood, cork, or other suitable material, is provided at one end with a recess or socket 6, defining a shoulder 7, and at its opposite end with a reduced cylindrical bore 8, which communicates with the socket 6 and forms a continuation thereof, as shown. The recess or socket 6 is provided with a metal tube or lining 9, and arranged within said tube and held in position by frictional engagement therewith is a removable sleeve or collar 10, which forms a holder for the clamping member 11. The clamping member 11 consists of a cylindrical plug formed of cork or other suitable yieldable material, said plug being provided with a longitudinal slit or kerf 12, adapted to receive the line 13 and clamp the same by frictional contact with the walls thereof. The mouth of the slit or kerf 12 is inclined or beveled, as indicated at 14, to permit the line to be readily introduced therein, said line passing through the sleeve or collar 10 and cylindrical bore 8, as shown. A metallic bushing 15 is inserted in the cylindrical bore 8 and serves to protect the submerged end of the bob from the action of the water.

In practice the plug or clamping member 11 is removed from the sleeve or collar and the line inserted in the longitudinal kerf thereof and through the cylindrical bore 8 of the bob, after which the plug is replaced and the sleeve or collar introduced in the socket 6. The bob may then be adjusted to any desired depth of water by sliding the same longitudinally on the line, the adjustment being effected without chaffing or otherwise injuring the line. The sleeve or collar 10 forms a holder for the plug or clamping member, which permits the latter to be readily removed and renewed when necessary, while the shoulder 7 forms a stop to limit the inward movement of said holder. By having the plug formed of yieldable material the bob is effectively clamped on the line without the necessity of looping, knotting, or otherwise tying the line.

In Fig. 4 of the drawings I have illustrated a modified form of the invention in which the float or bob is provided with a tapering longitudinal bore 16 and a continuous seamless tube or lining 17, the clamping member or plug 18 being inserted in the end of the tube, as shown.

In some cases the float or bob may be made hollow and formed of aluminium, in which event the central tube or lining may be dispensed with and the clamping member inserted in the orifice at the top of the bob.

Having thus described the invention, what is claimed is—

1. A fishing-bob provided with a longitudinal bore and having a socket formed in one end thereof, a sleeve or holder fitting within the socket, and a line-clamping member carried by the holder.

2. A fishing-bob provided with a longitudinal bore and having a socket formed in one end thereof, a sleeve or holder fitting within the socket, and a removable line-clamping member carried by the holder.

3. A fishing-bob provided with a longitudinal bore and having a socket formed in one end thereof, a sleeve or holder fitting within the socket, and a yieldable line-clamping member removably mounted in the holder.

4. A fishing-bob provided with a line-receiving bore and having a socket formed in one end thereof, a sleeve or holder fitting within the socket, and a removable plug carried by the holder, said plug being provided with a slot or kerf adapted to receive and clamp the line.

5. A fishing-bob provided with a line-receiving bore and having a socket formed in one end thereof, and a removable plug formed of yieldable material carried by the holder and adapted to clamp the line, said plng being provided with a longitudinal slit or kerf the mouth of which is inclined or beveled to facilitate the introduction of said line.

6. A fishing-bob provided with a line-receiving bore and having a socket formed in one end thereof defining a shoulder or stop, a sleeve or holder fitting within the socket and engaging said shoulder, and a yieldable slotted plug removably mounted in the holder and adapted to clamp the line.

7. A fishing-bob provided with a line-receiving bore and having a socket formed in one end thereof, a metal tube arranged within the bore and socket respectively, a detachable sleeve or holder fitting within the socket, and a removable slotted plug carried by the holder and adapted to clamp the line.

In testimony that I claim the foregoing as my own I have hereto affixed my signature in the presence of two witnesses.

ANDREW J. McCORD.

Witnesses:
WALTER S. SMITH,
BENJAMIN B. McCOWEN.